United States Patent [19]
Monahan

[11] Patent Number: 5,929,760
[45] Date of Patent: Jul. 27, 1999

[54] RFID CONVEYOR ANTENNA

[75] Inventor: Brian Monahan, Santa Cruz, Calif.

[73] Assignee: Escort Memory Systems, Scotts Valley, Calif.

[21] Appl. No.: 08/953,815

[22] Filed: Oct. 20, 1997

[51] Int. Cl.$^6$ .................................................. G08B 13/14
[52] U.S. Cl. ................................ 340/572.7; 340/572.1; 343/720; 343/764; 343/765; 343/766; 343/866
[58] Field of Search .................................. 340/572, 571, 340/551, 676, 572.1, 572.2, 572.3, 572.4, 572.5, 572.7, 572.8, 572.9; 343/788, 741, 748, 866, 720, 732, 757, 758, 759, 760, 764, 765, 766; 342/44; 426/237; 235/439, 440, 491

[56] References Cited

U.S. PATENT DOCUMENTS

| | | | |
|---|---|---|---|
| 3,720,940 | 3/1973 | Fox et al. ................................ | 342/44 |
| 3,832,530 | 8/1974 | Reitboeck et al. ..................... | 235/439 |
| 5,012,236 | 4/1991 | Troyk et al. ........................... | 340/572 |
| 5,221,831 | 6/1993 | Geiszler ................................ | 235/440 |
| 5,274,392 | 12/1993 | D'Hont ................................ | 343/866 |
| 5,305,002 | 4/1994 | Holodak .............................. | 343/788 |
| 5,406,263 | 4/1995 | Tuttle .................................. | 340/572 |
| 5,565,846 | 10/1996 | Geiszler et al. ....................... | 340/572 |
| 5,589,819 | 12/1996 | Takeda ................................ | 340/571 |
| 5,593,713 | 1/1997 | De La Luz-Martinez et al. .... | 426/237 |

*Primary Examiner*—Benjamin C. Lee
*Attorney, Agent, or Firm*—Francis Law Group

[57] ABSTRACT

An RFID antenna system is described comprising an elongated antenna disposed proximate an interrogation path for interrogating transponders moving along the interrogation path. The antenna is oriented such that the longitudinal axis of the antenna is substantially perpendicular to said interrogation path. The antenna provides an active RF interrogation zone that intersects at least 40% of the horizontal longitudinal plane of the interrogation path.

9 Claims, 6 Drawing Sheets

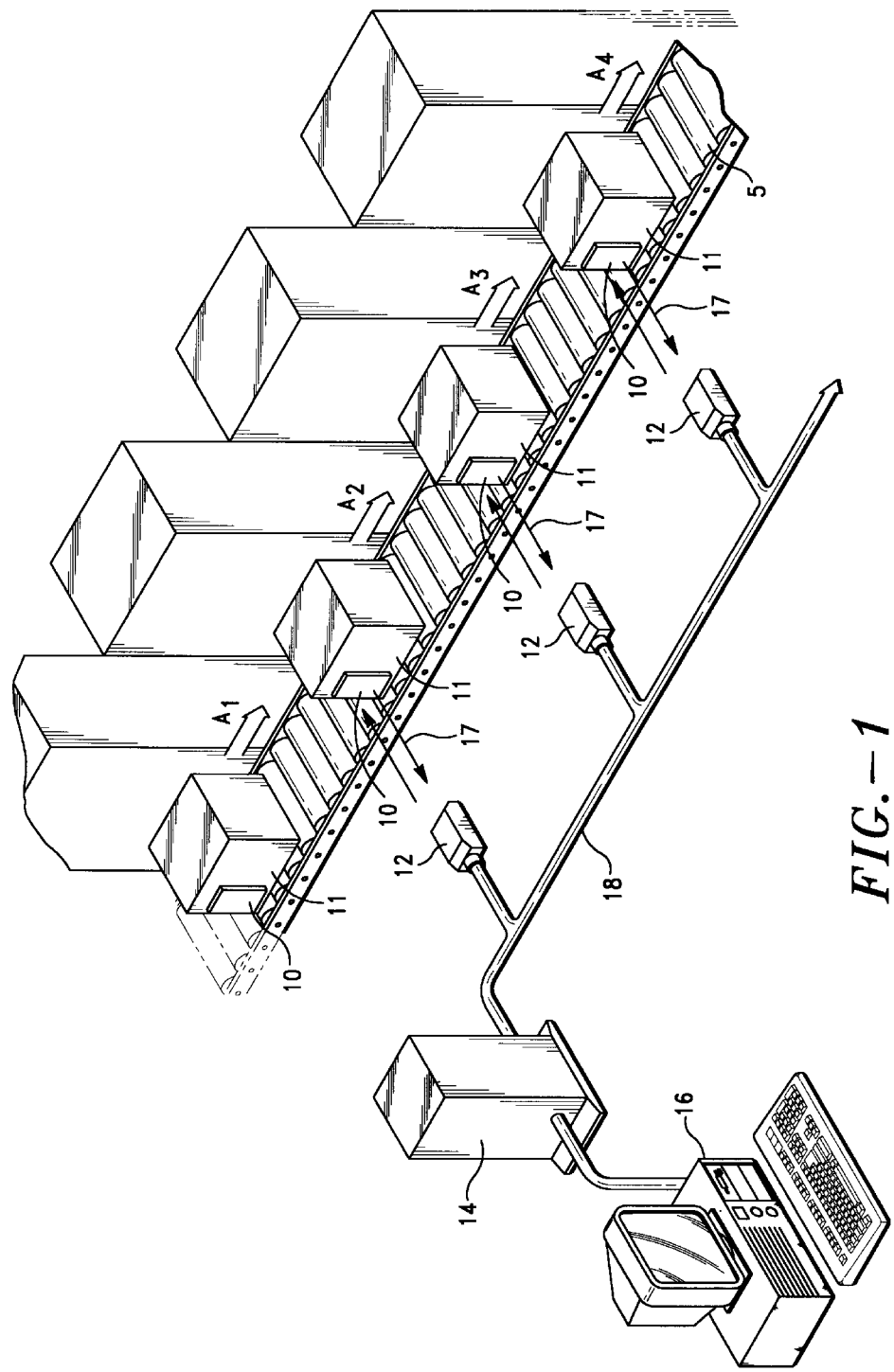
FIG.-1
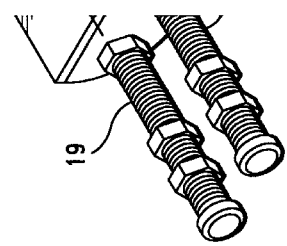

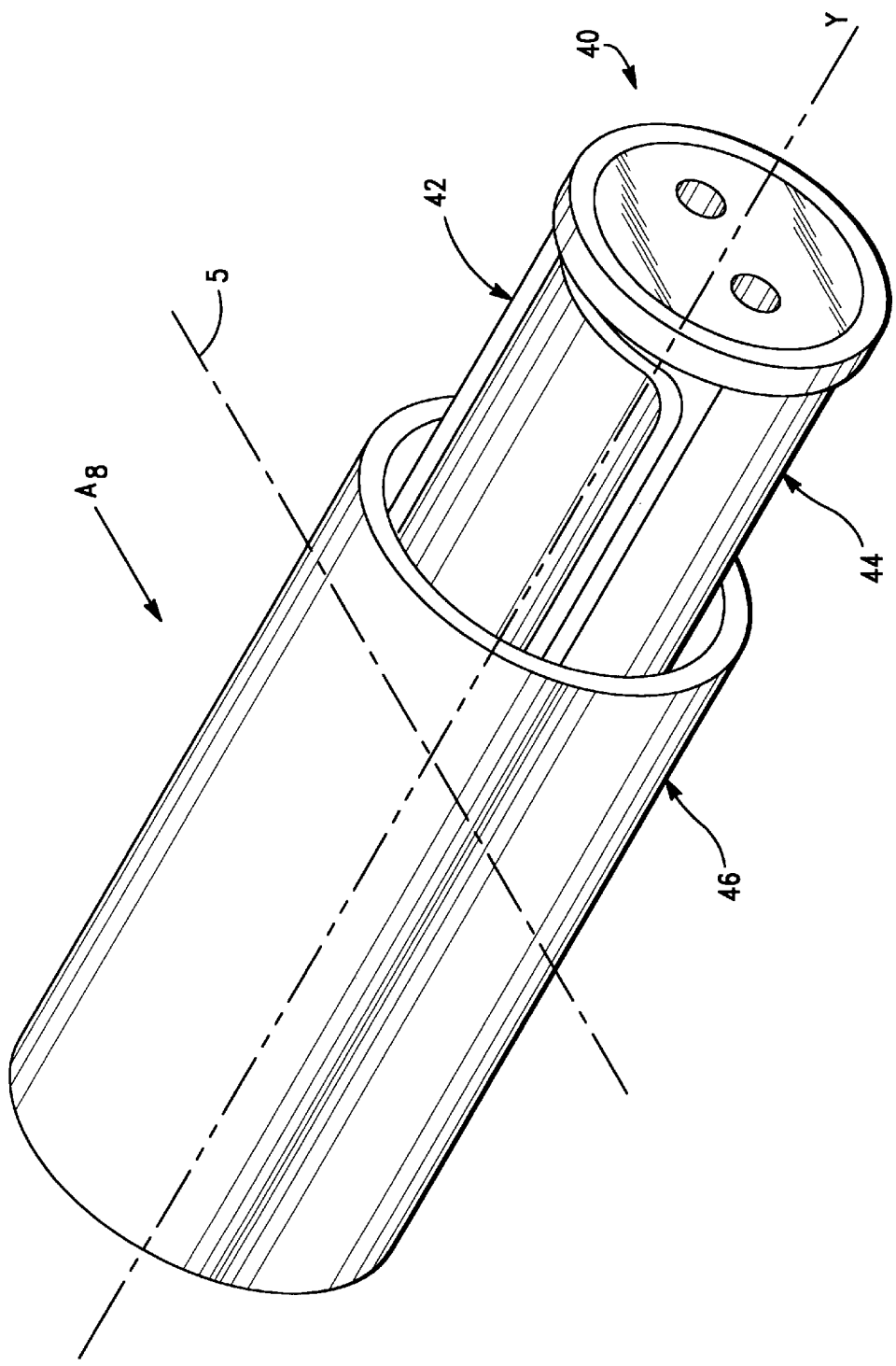

RFID CONVEYOR ANTENNA

FIELD OF THE INVENTION

The present invention relates in general to radio frequency identification (RFID) devices, and more particularly to a RFID antenna.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transponder receives its power from the base station or interrogator, such as the identification system disclosed in U.S. Pat. No. 4,654,658.

A typical RFID system is made up of reusable transponders or tags fixed to or embedded in product carriers, an antenna system that interrogates the tags via a RF link and a controller. The host (or computer) system interfaces with the controller and directs the interrogation of the tags.

The RFID antenna system typically employs a high frequency signal to interrogate the tags and, hence, product carriers which are moved on an interrogation path, such as a conveyor. The antenna system is generally disposed near the interrogation path to provide effective communication to and from the tags.

The location of the antenna is critical to the interrogation and receipt of the identification code and other data transmitted to and from the tags. For example, if a relatively small single antenna is employed or the antenna is positioned too far from the interrogation path, inadequate coverage of the interrogation path will occur.

Several attempts have been made to optimize the RF link and, hence, communication between the antenna and the tags. In one (typically employed) approach, a frame antenna of rectangular or square shape is fitted around the conveyor.

The noted system has several drawbacks. In particular, the antenna system exhibits one or more dead zones for certain tag positions. For example, there is a dead zone across the very center of the conventional frame antenna. If a tag is located within a window which is parallel to the conveyor belt and comprises some distance on either side of the center frame axis, and maintains this position throughout the read area of the antenna, the tag would not be read.

Moreover, the accuracy and completeness of the reading also decreases if several tags are following one another in close succession during movement along the conveyor. When tags are in close succession, and relatively far from the read antenna, the tags appear to be the same distance from the read antenna and thus send back simultaneous transmissions. The result of a simultaneous transmission is an unintelligible identification code. This is particularly the case in a noisy environment, for which shielding would be necessary.

It is, therefore, an object of the present invention to provide a RFID antenna system which provides optimum coverage over the interrogation path.

It is another object of the present invention to provide a RFID antenna which is readily incorporated into a conveyor system to provide accurate interrogation of tags fixed to or embedded in product carriers.

SUMMARY OF THE INVENTION

In accordance with the objects and advantages of the present invention, the RFID conveyor antenna system for communicating with at least one transponder moveable along an interrogation path comprises an elongated antenna disposed proximate the interrogation path for interrogating the transponder, the antenna being oriented such that the longitudinal axis of the antenna is substantially perpendicular to the interrogation path and provides an active RF interrogation zone that intersects at least 40% of the horizontal longitudinal plane of the interrogation path.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 1 is a schematic illustration of a typical RFID system;

FIG. 8 is an exploded perspective view of a second embodiment of the RFID antenna, according to the invention.

DETAILED DESCRIPTION OF THE INVENTION

Figure 2:
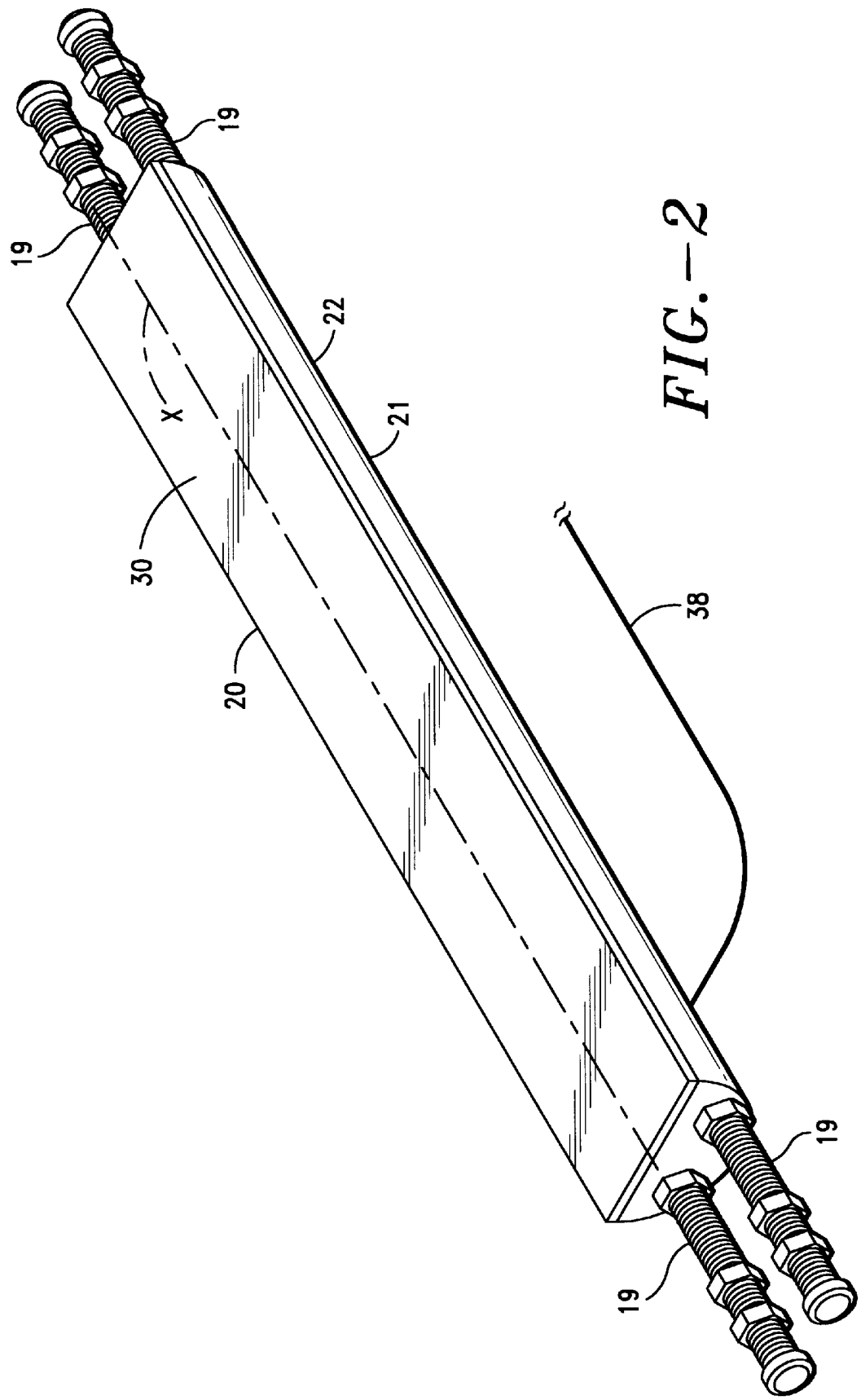
FIG. 2 is a perspective view of one embodiment of the RFID antenna, according to the invention.

The RFID antenna of the present invention substantially reduces or eliminates the disadvantages and shortcomings associated with prior art antenna systems. According to the invention, an elongated antenna is disposed proximate the interrogation path for interrogating transponders moving along the interrogation path. The antenna is oriented such that the longitudinal axis of the antenna is substantially perpendicular to the interrogation path and provides an active RF interrogation zone (or field component) that intersects at least 40% of the horizontal longitudinal plane of the interrogation path.

Referring first to FIG. 1, there is shown a simple read/write RFID system. The system typically comprises one or more transponder or tags 10, at least one antenna 12 to communicate with the tags 10, and a controller 14 for managing the communications interface. The host system (i.e., computer) 16 interfaces with the controller 14 and directs the interrogation of the tags 10 disposed on or embedded in the product carriers 11 and any following action via parallel, serial or bus communications 18.

As illustrated in FIG. 1, each antenna 12 is disposed on one side of the interrogation path, denoted by Arrows $A_1$–$A_4$, which is defined by the conveyor 5. As such, the RF link 17 and, hence, active RF zone is limited. By the term "active RF interrogation zone", as used herein, it is meant to mean the zone defined by the effective RF radiation or electro-magnetic field component.

Referring now to FIG. 2, there is shown a perspective view of a first embodiment of the RFID antenna 20 of the present invention. According to the invention, the antenna 20 has a substantially elongated housing 21 with a longitudinal axis, denoted X.

Figure 4:
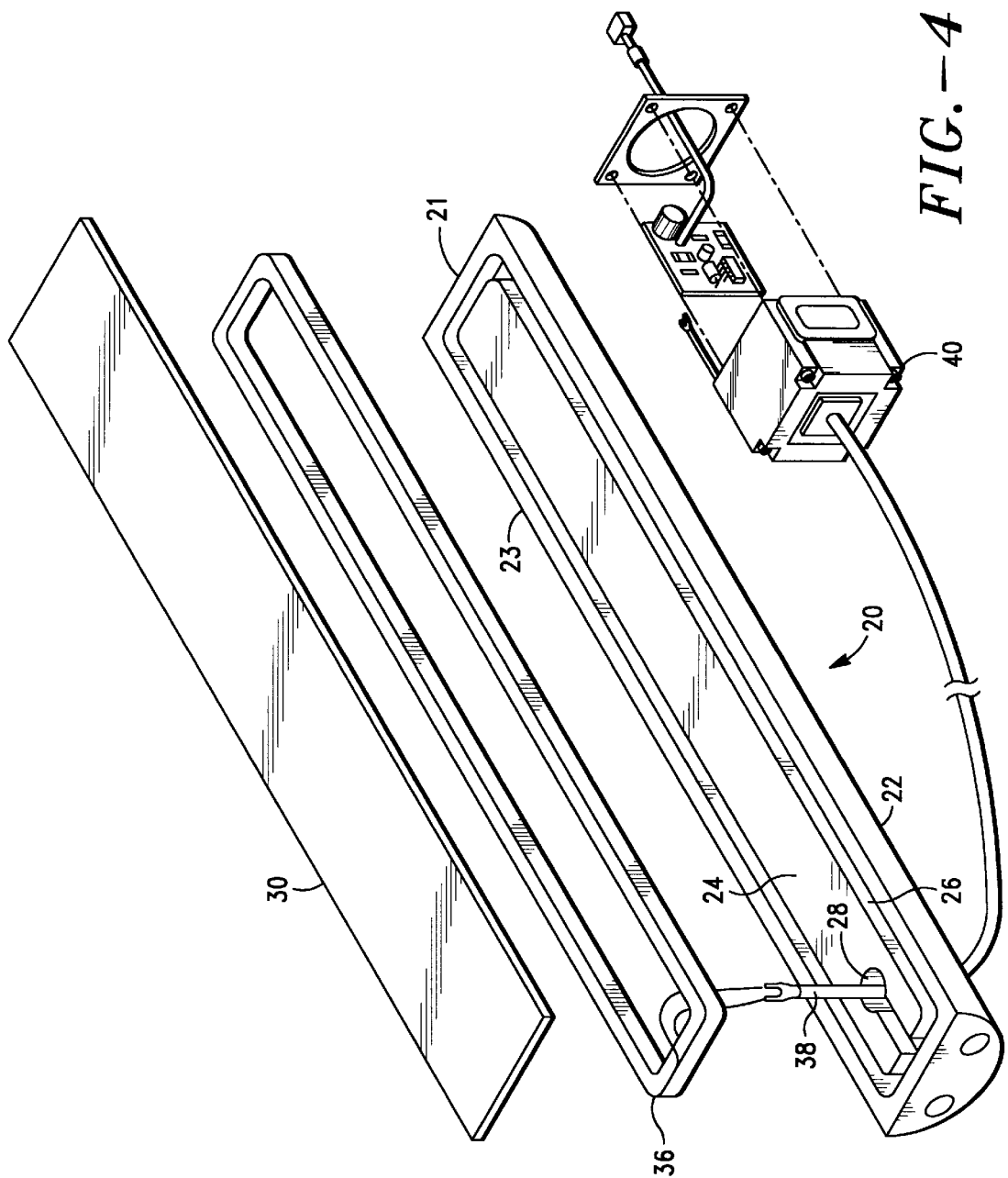
FIG. 4 is an exploded perspective view of the RFID antenna shown in FIG. 2.

As illustrated in FIG. 4, the antenna housing 21 comprises a base 22 and a top 30. The base 22 is provided with a circumferential antenna seat 26 which is disposed proximate the outer edge 23 of the top surface of the base 22. As discussed below, the seat 26 is adapted to receive and position the loop antenna 36 therein.

The base 22 is also provided with a wiring access port 28 to receive the antenna leads or wiring 38 therethrough. As will be appreciated by one having ordinary skill in the art, various wiring access means may be employed within the scope of the invention to facilitate the connection of the antenna 38 to a controller.

Figure 3:
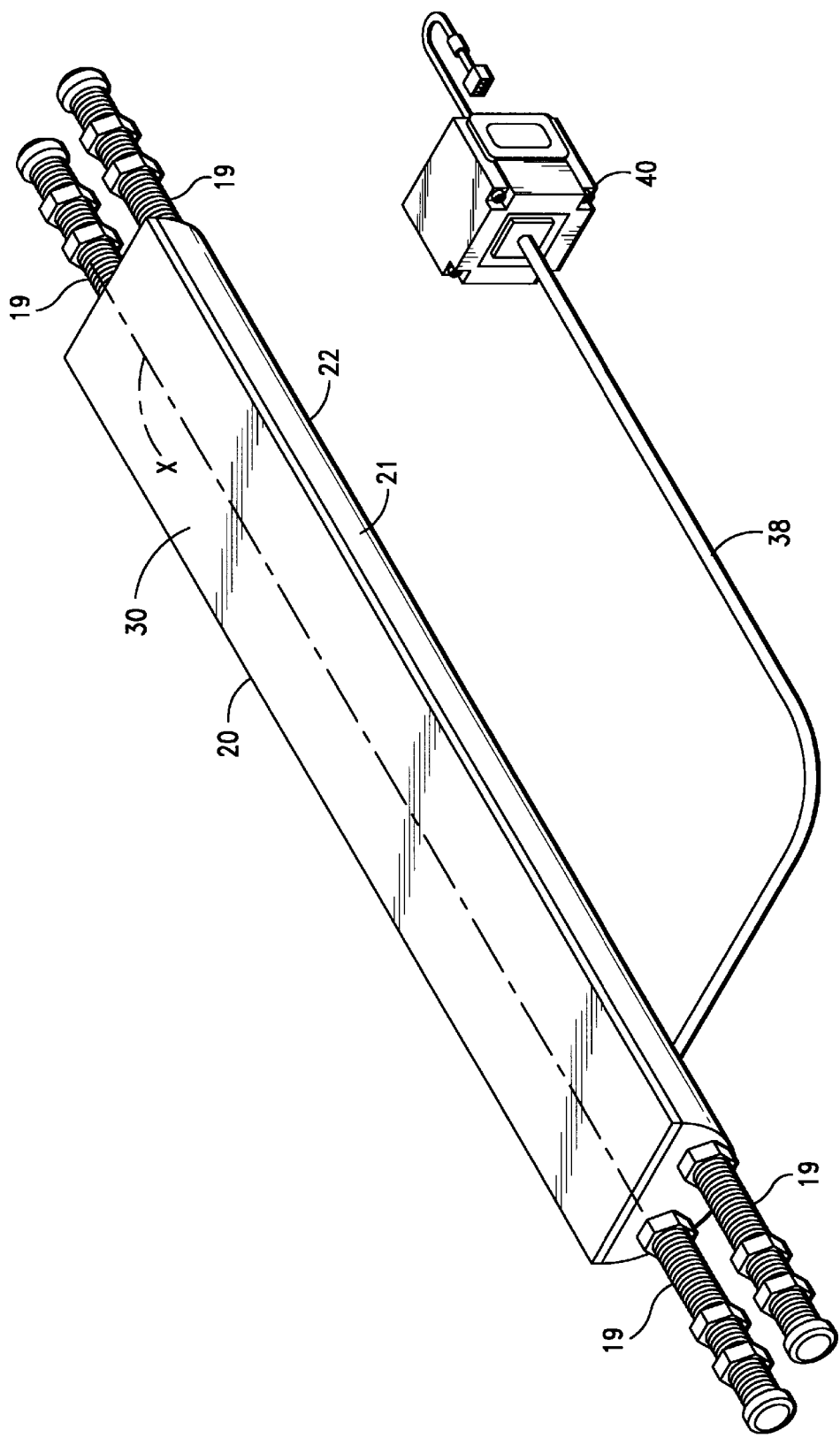
FIG. 3 is perspective view of the RFID antenna shown in FIG. 2 operatively attached to an antenna head assembly.

As illustrated in FIGS. 3 and 4, the housing top 30 has a correspondingly similar shape as the top surface 24 of the base 22. The top 30 is bonded to the base 22 by conventional means, such as a screws, rivets, epoxy or other like adhesives.

According to the invention, the housing 21 can comprise various lightweight materials, such as acrylonitrile butadiene-styrene (ABS), polycarbonate, or polyvinyl chloride (PVC). The housing material must, however, provide minimal interference and/or restriction of the antenna RF radiation or electromagnetic field. In a preferred embodiment, the housing material comprises a polyvinyl chloride (PVC).

Referring now to FIG. 4, there is shown the RFID antenna 20 of the present invention operatively connected to a RS427 antenna head assembly 40, manufactured and distributed by Escort Memory Systems, Scotts Valley, Calif. The head assembly includes the antenna logic and associated circuitry.

As will be appreciated by one having ordinary skill in the art, since the RFID antenna system of the present invention includes all the circuitry necessary to convert the digital signals received from a controller to high speed RF signals for the transponder or tags, and conversely to convert the RF signals from the tags back into digital signals for the controller, numerous controllers can be employed with the antenna.

Figure 5:
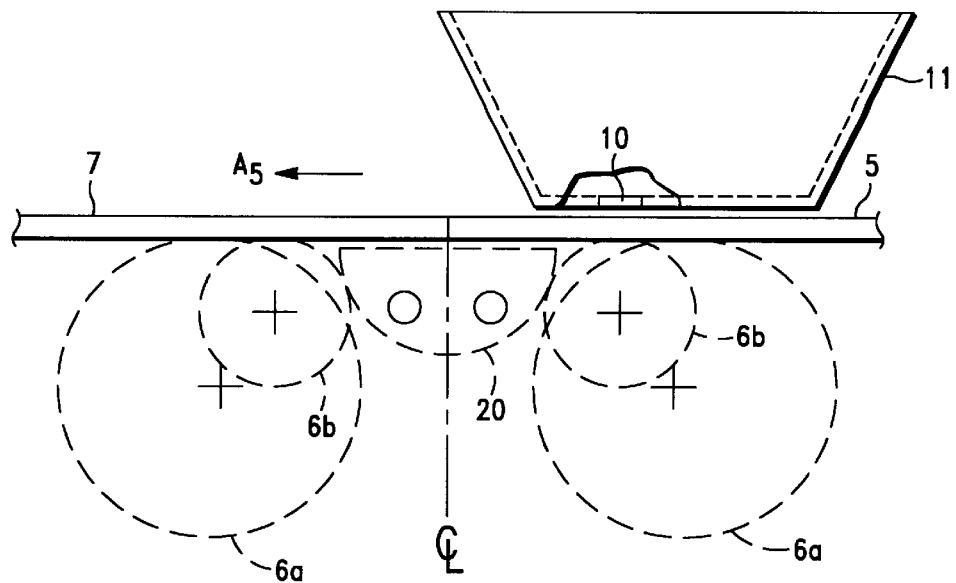
FIG. 5 is a side view schematic illustration of the RFID antenna, shown in FIG. 2 disposed on a conveyor system, according to the invention.
Figure 6:
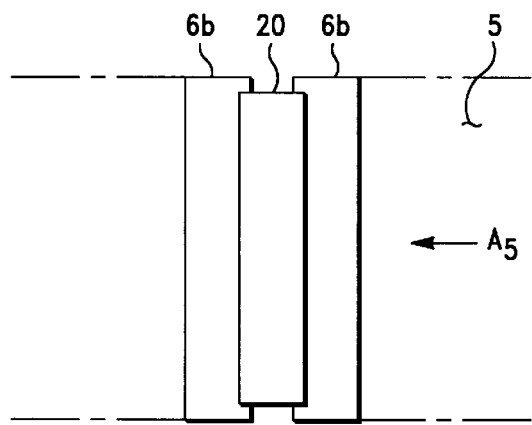
FIG. 6 is a top view of the RFID antenna shown in FIG. 2 disposed on a conveyor system.

A key feature of the present invention is the ability of the antenna 20 to be positioned proximate to or incorporated into a conveyor system 5. As illustrated in FIGS. 5 and 6, the antenna 20 is disposed proximate the interrogation path, denoted by Arrow $A_5$, of the conveyor 5 for interrogating the tags 10 and, hence, products or product carriers 11, moving along the interrogation path. According to the invention, the distance between the top 30 of the antenna 20 and the horizontal plane defined by the conveyor top surface 7 is preferably in the range of approximately 0 in. to 6 in., more preferably 0.030 in. to 2 in.

In a preferred embodiment illustrated in FIGS. 5 and 6, the antenna 20 is disposed between the conveyor rollers. As illustrated in FIG. 5, the antenna 20 is designed and adapted to be positioned between large rollers 6a or small rollers 6b.

As will be appreciated by one having ordinary skill in the art, various conventional means may be employed to mount the antenna 20 between the rollers on the conveyor 5. In a preferred embodiment, engagement rods 19 are provided to facilitate the mounting of the antenna 20 (see FIG. 3). The rods 19 are designed and adapted to engage mounting holes (not shown) on the conveyor 5.

Figure 7:
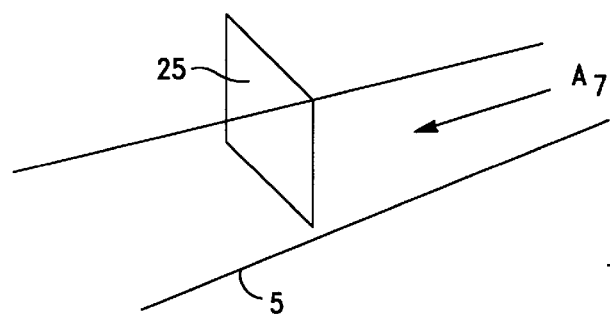
FIG. 7 is a schematic illustration of the radiation pattern of the RFID antenna, according to the invention.

Referring now to FIG. 6, according to the invention, the antenna 20 spans a range of approximately 40% to 100% of the conveyor 5. As illustrated in FIG. 7, the antenna 20 thus provides an active RF interrogation zone (or field component) 25, which is projected in a substantially vertical direction and perpendicular to the horizontal longitudinal plane of the interrogation path, denoted by Arrow $A_7$.

In a preferred embodiment of the invention, the RF interrogation zone 25 intersects at least 95% of the horizontal longitudinal plane of the interrogation path. As a result, the antenna of the invention provides an optimal RF link and, hence effective interrogation of a plurality of tags moving along an interrogation path.

Referring now to FIG. 8, there is shown a second embodiment of the invention, wherein the antenna 42 is incorporated directly into a conveyor roller 40. In the noted embodiment, the roller 40 includes an antenna core 44, with the antenna (i.e., antenna coil) 42 disposed thereon, and an outer roller shell 46. The core 44 is provided with a conventional roller bearing 48 disposed on each end to support and position the shell 46 on the core 44.

According to the invention, the roller 40 (core 44 and shell 46) can comprise a lightweight, high strength material such as acrylonitrile-butadiene-styrene (ABS), polyvinyl chloride (PVC), polycarbonate, urethane, polyethylene terephthalate glycol (PETG) and polystryene. In a preferred embodiment, the roller 40 comprises ABS.

As illustrated in FIG. 8, the roller 40 would be disposed proximate the interrogation path, denoted by Arrow $A_8$, and oriented such that the longitudinal axis Y of the roller 40 is substantially perpendicular to the interrogation path. The roller 40 would thus similarly provide an active RF interrogation zone which would intersect at least 40%, preferably, at least 95%, of the horizontal longitudinal plane of the interrogation path.

What is claimed is:

1. A RFID antenna system for communicating with at least one transponder moveable along an interrogation path having a substantially horizontal longitudinal plane, comprising:

an elongated antenna unit disposed proximate said interrogation path for interrogating said transponder moving along said interrogation path, said antenna unit including an elongated base having a substantially rectangular interior portion, a substantially planar antenna disposed within said base and a top removably engaged to said housing, said top comprising a RF transmissive material, said antenna comprising at least one substantially rectangular elongated loop of wire having a longitudinal axis, said longitudinal axis being disposed substantially perpendicular to said interrogation path, said loop of wire defining a planar surface, said loop of wire being substantially concentric with said base interior portion, said antenna providing transmitting and receiving electromagnetic fields projected substantially perpendicular to said planar surface, said electro-magnetic fields being directed in a substantially vertical direction that intersects at least 40% of the width of said interrogation path.

2. The antenna system of claim 1, wherein said RF interrogation zone intersects approximately 40% to 100% of said horizontal longitudinal plane of said interrogation path.

3. The antenna system of claim 2, wherein said RF interrogation zone intersects approximately 95% of said horizontal longitudinal plane of said interrogation path.

4. The antenna system of claim 1, wherein the operating distance between said antenna unit and said transponder is in the range of 0 in. to 6 in.

5. The antenna system of claim 1, wherein said transponder comprises decision making circuitry and a memory.

6. The antenna system of claim 5, wherein said transponder includes a power source.

7. The antenna system of claim 1, wherein said antenna unit provides a substantially uni-directional RF interrogation zone.

8. A RFID antenna for a conveyor system, said conveyor including a belt and a plurality of rollers, comprising:

an elongated substantially cylindrical outer roller shell, said shell comprising a RF transmissive material, said roller shell adapted to operatively contact said conveyor belt; and an antenna core disposed within said roller shell, said core including bearing means disposed on each end of said antenna core adapted to rotatably engage and support said roller shell;

said antenna core providing a substantially planar uni-directional active RF interrogation zone.

9. The RFID antenna of claim 8, wherein said RF interrogation zone extends across at least 40% of the width of said conveyor.

* * * * *